Figures 9, 10:
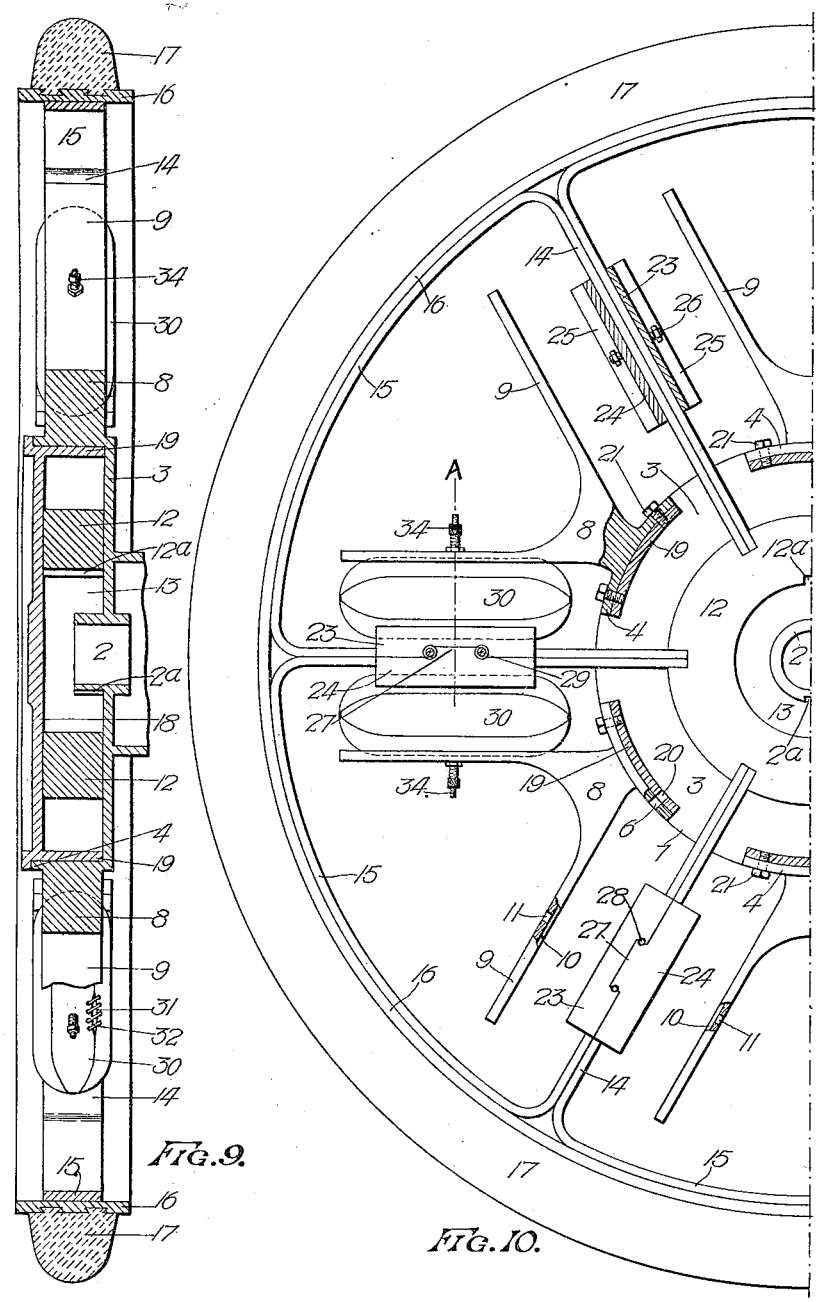

R. T. PARK.
RESILIENT WHEEL.
APPLICATION FILED MAY 20, 1914.
1,139,065.
Patented May 11, 1915.
2 SHEETS—SHEET 1.
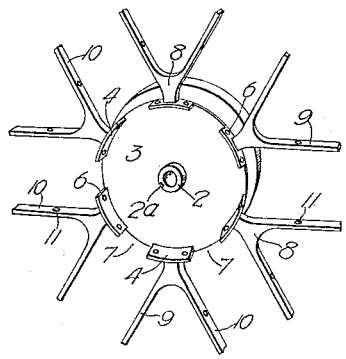
Fig. 1.
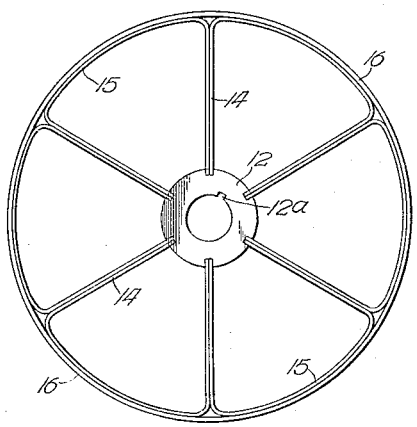
Fig. 2.
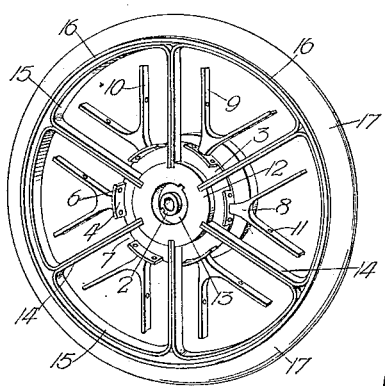
Fig. 3.
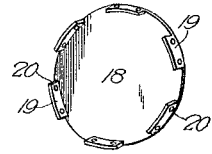
Fig. 4.
Fig. 5.
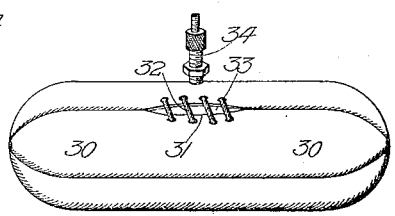
Fig. 6.
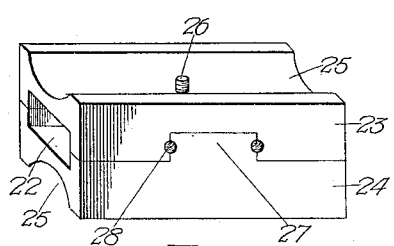
Fig. 7.
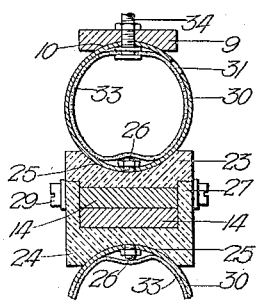
Fig. 8.
Witnesses
Inventor:
R. T. Park.
By Jno. Imirie
Atty.

R. T. PARK.
RESILIENT WHEEL.
APPLICATION FILED MAY 20, 1914.

1,139,065.

Patented May 11, 1915.
2 SHEETS—SHEET 2.

Witnesses
Floyd R Cornwall
Louis Miller

Inventor
R. T. Park
By Jno. Imirie
Atty.

UNITED STATES PATENT OFFICE.

RICHARD THOMAS PARK, OF SOUTH MELBOURNE, MELBOURNE, VICTORIA, AUSTRALIA, ASSIGNOR TO R. T. P. PATENT WHEELS PROPRIETARY LIMITED, OF MELBOURNE, AUSTRALIA, A CORPORATION OF VICTORIA, AUSTRALIA.

RESILIENT WHEEL.

1,139,065.        Specification of Letters Patent.        Patented May 11, 1915.

Application filed May 20, 1914. Serial No. 839,824.

*To all whom it may concern:*

Be it known that I, RICHARD THOMAS PARK, a subject of the King of Great Britain and Ireland, and a resident of the city of South Melbourne, a suburb of the city of Melbourne, in the county of Bourke, State of Victoria, Commonwealth of Australia, (whose post-office address is 137 York street, in the said city of South Melbourne,) have invented a certain new and useful Improved Resilient Wheel, of which the following is a specification.

This invention relates to resilient wheels, particularly intended for use with motor vehicles, of the kind having a floating rim between which rim and the wheel hub cushions are disposed with the object of preventing road shocks passing to the vehicle axle and also, in most instances dispensing with the usual pneumatic tire. Hitherto such wheels have often been of a complex nature, costly to manufacture, the cushioning effect has been insufficient, and it has been difficult to readily obtain access to the said cushions, which have sometimes been subjected to undue strain. In addition, when some wheels occupy certain positions in relation to the road, shocks encountered are not cushioned the effect being irregular, uncomfortable and detrimental to the vehicle.

The object of this invention is to provide a vehicle wheel which is comparatively cheap to manufacture, simple in construction and by the use of which increased comfort is provided for passengers using the vehicle, and not only are shocks prevented from reaching the vehicle axle but the wear and tear on the tire of the wheel is greatly reduced. By the invention, further, the cushions are not subjected to severe strain, and not liable to rupture or wear and a low air pressure only is required if pneumatic cushions, which are preferred, be used.

Referring to the drawings which form a part of this specification, Figure 1 is a perspective view of a hub element showing a series of pairs of outstanding arms between which, spokes, seen in Fig. 2 pass. Fig. 2 is a side elevation of a rim element comprising a hub ring, spokes radiating therefrom, and a rim encircling the spokes. Fig. 3 is a perspective view showing clearly the relationship between the hub and rim elements. Fig. 4 is a perspective view of an emergency centralizer. Fig. 5 is a perspective view of a cover plate. Fig. 6 is a perspective view of a pneumatic cushion. Fig. 7 is a perspective view of a slide. Fig. 8 is a sectional view, taken on line A—A, Fig. 10. Fig. 9 is a transverse sectional view of a wheel according to the invention, portions being broken away for convenience of illustration. Fig. 10 is a side elevation partly in section of one half of the wheel, portions being broken away and removed for convenience of illustration.

The invention includes a hub element consisting of a boss 2 through which is an axle hole through which the axle of the vehicle passes. Formed in the boss is a keyway $2^a$. Integral with the boss is an inner plate or disk 3 having protruding from its periphery a series of overhanging flanges 4 each having therein screw holes, indicated at 6. Formed between the flanges 4 is a series of openings or passageways indicated at 7. Passing from each flange 4 is a stem 8 protruding from which is a pair of outstanding arms 9 each having formed in its side face a part circular groove, indicated at 10. Formed through each arm 9 is a hole indicated at 11.

With the foregoing is used a rim element comprising a hub ring 12 encircling the boss 2. Formed in the ring 12 is a keyway $12^a$. The said ring is of larger internal diameter than the external diameter of the boss. An annular space, indicated at 13, is thereby provided between the said boss and ring. Passing from the hub ring 12 is a series of radial spokes 14. These pass through the openings or passageways 7. Extending between the outer ends of the spokes 14 are rim portions 15. Encircling the portions 15 and secured thereto is a rim 16 carrying a solid rubber or other tire 17.

Removably secured to the hub element is an outer plate or disk 18 having a series of overhanging flanges 19 protruding from its periphery. The flanges 19 correspond with the flanges 4. Formed in the flanges 19 are screw holes 20. Passing through the screw holes 6 and the screw holes 20, are screws 21 retaining the plate 18 in position.

Upon each spoke 14 is a slide having therethrough a passageway indicated at 22, the spoke passing through the passageway. Each slide consists of a first portion 23 and a second portion 24. Formed in each portion is a part circular channel indicated at 25. Protruding from each portion and disposed in the channel 25 thereof is a retention stud 26. Projecting from each side of one of the portions of the slide is a protuberance 27, the other slide portion having formed in each of its sides a recess. The protuberances pass into the recesses. Formed in the slide at the junction of the first and second portions are threaded holes, indicated at 28. Passing into the holes 28 are holding screws 29, the two portions of the slide being thereby retained together.

Disposed between the slides and the outstanding arms 9 is a series of pneumatic cushions. Each cushion is elongated and consists of an outer cover 30 having therein a stud hole and a valve hole. Passing through the stud holes of the covers 30 are the studs 26 of the slides. Each cover is also provided with an entrance hole, indicated at 31, which hole is closed by a lace 32 or the like. Within each cover, and entered therein through the hole 31, is an inner air bag 33 having a valve 34 passing through the valve hole of the said cover. Instead of pneumatic cushions, solid rubber, cellular rubber or other resilient cushions may be used.

With the foregoing is provided an emergency centralizer 35 having therein screw holes 36. The internal diameter of the centralizer corresponds with the external diameter of the boss 2. The inner circumferential edge is rounded or beveled to permit of the said centralizer readily passing over the said boss. Protruding inwardly from the centralizer is a key 35ª passing into the keyway 2ª when the centralizer is in use. The external diameter of the centralizer corresponds with the internal diameter of the hub ring 12. Protruding outwardly from the centralizer is a key 37 for engagement in the keyway 12ª so that by placing the centralizer 35 in the annular space 13 the hub element and the rim element are prevented from moving in relation to each other in any direction.

With this invention upon a wheel encountering an obstruction or road inequality the rim 16 of the said wheel rises carrying with it the spokes 14 and hub ring 12. Vertical movement of the rim and spokes 14 is provided for by means of the slides through which the spokes 14 freely move, the said slides being retained by the hub element. It will be seen that each pneumatic cushion while secured to its slide is also secured to the corresponding outstanding arm 9 of the hub element by means of the valve 34.

In practice it is found that but a low pressure of air is required within the pneumatic cushions to effectively absorb the road shocks and yet retain the hub and rim elements concentric under normal conditions. Circumferential movement or lag of the rim is overcome by the pneumatic cushions. Lateral strain is prevented by means of the inner and outer plates 3 and 18. It is also minimized by reason of the cushions resting in the grooves 10 and channels 25. Should a cushion or a limited number of cushions become deflated and spare air bags 33 not be available the vehicle may nevertheless proceed, the remaining air bags being inflated to a greater pressure to create the necessary resiliency. In the event of a number of air bags becoming deflated by removing the outer plate 18 and inserting the emergency centralizer 35 between the boss 2 and the hub ring 12 a solid wheel is provided which relies upon the tire 17 to absorb any road shocks until the defective cushions are repaired. The keys 35ª and 37 prevent circumferential movement between the hub and rim elements. To remove the stop ring 35 it is only necessary to thread a screw into each of the screw holes 36 when the said ring may be easily withdrawn.

Instead of employing pneumatic cushions, solid rubber, cellular or other cushions may be used as aforementioned. The pneumatic type, however, is preferred as the air pressure required is comparatively low and the said cushions are, in practice found not to be liable to rupture, wear or undue strain.

Having now described my invention what I claim as new and desire to secure by Letters Patent is:—

1. An improved resilient wheel, consisting of a hub element having outstanding flanges, a series of outstanding arms mounted on said flanges, a rim element having a series of radial spokes parallel with adjacent arms, a rim encircling said spokes, a tire carried by the rim, a slide mounted upon each spoke, a series of elongated pneumatic cushions secured to the slides of the spokes and the adjoining outstanding arms, and an outer plate secured to the hub element.

2. An improved resilient wheel, consisting of a hub element having a series of overhanging flanges, arms outstanding from said flanges, a rim element having a hub ring encircled by said flanges, a series of radial spokes protruding from said ring and passing between the flanges and the outstanding arms of each flange, a slide mounted upon each spoke and a series of tangential cushions secured to the outstanding arms and to the slides.

3. An improved resilient wheel, consisting of a hub element having a boss, flanges protruding from said element and overhanging said boss, said flanges having openings or passageways therebetween, a pair of outstanding arms protruding from each flange, a rim element consisting of a hub ring encircling the boss and encircled by the flanges, spokes radiating from said ring and passing through the openings between the flanges, said spokes being parallel with the adjoining arms, a slide mounted upon each spoke, and a series of elongated cushions secured to the outstanding arms and the slides.

4. An improved resilient wheel, consisting of a hub element having a series of outstanding arms, a rim element having a series of radial spokes, each spoke being parallel with the adjoining arms and a series of elongated pneumatic cushions disposed between the arms and the spokes, each cushion comprising an outer cover and an inner air bag.

5. An improved resilient wheel, consisting of a hub element having a boss, a series of flanges protruding from said element and overhanging said boss, a pair of arms outstanding from each flange, a rim element having a hub ring encircling the boss and encircled by the flanges, a series of spokes radiating from the hub ring and passing between the flanges and pairs of arms carried thereby, a slide mounted upon each spoke, and a series of pneumatic cushions secured to the slides and the outstanding arms, each cushion comprising an outer cover and an inner air bag.

6. An improved resilient wheel, consisting of a hub element having a boss, a series of flanges protruding from said element and overhanging said boss, said flanges having openings or passageways therebetween, a pair of arms outstanding from each flange, each arm having a part circular groove therein, a rim element consisting of a hub ring encircling the boss and encircled by the flanges, a series of spokes radiating from the hub ring, a rim encircling the spokes, a tire carried by the rim, an outer plate having flanges secured to the flanges of the hub element, a slide mounted upon each spoke, each slide consisting of a first and a second portion, each portion having a part circular channel therein, and a series of pneumatic cushions disposed in the channels of the slides and the grooves of the outstanding arms and secured to said slides and arms.

7. An improved resilient wheel, consisting of a hub element having a boss, a series of flanges protruding from said element and overhanging said boss, a pair of arms outstanding from each flange, each arm having a part circular groove therein, a rim element consisting of a hub ring encircling the boss and encircled by the flanges, a series of spokes radiating from said ring, a rim encircling the spokes, a tire carried by the rim, an outer plate having flanges secured to the flanges of the hub element, a slide mounted upon each spoke, each slide consisting of a first and a second portion, each portion having a part circular channel therein, each slide having threaded holes at the junction of the first and second portions, screws passing into said holes, and a series of pneumatic cushions disposed in the channels of the slides and the grooves of the outstanding arms, each cushion consisting of an outer cover and an inner air bag within the cover, the covers being secured to the slides and the bags being secured to the outstanding arms.

8. An improved resilient wheel consisting of a rim element having radial spokes and a hub element having arms corresponding to the radial spokes and parallel therewith, said rim element and hub element being disposed in movable relation, and a series of elongated pneumatic cushions interposed each side of the spokes and adjacent arms controlling movement between the hub and rim elements.

9. In a resilient wheel, the combination of a hub, a plurality of pairs of arms extending from the hub, adjacent arms of adjacent pairs being parallel, a rim, a ring having circumferential movement independent of the hub, radial spokes extending between the ring and the rim, said radial spokes being between and parallel with the adjacent arms of the adjacent pairs of arms, slides on the radial spokes, and elongated cushion elements interposed between the radial spokes and the adjacent parallel arms, said elongated cushion elements being disposed parallel with the spokes.

In testimony whereof I have hereunto affixed my signature in the presence of two subscribing witnesses.

RICHARD THOMAS PARK.

Witnesses:
    CECIL M. LE PLASTIEN,
    GEORGE A. U'REN.

Copies of this patent may be obtained for five cents each, by addressing the "Commissioner of Patents, Washington, D. C."